Patented Apr. 17, 1945

2,373,807

UNITED STATES PATENT OFFICE 2,373,807

PROCESS OF PURIFYING PHOSPHORIC ACID ESTERS

Hermann Beeg and Rudolf Schmidt, Magdeburg, Germany; vested in the Alien Property Custodian No Drawing. Application March 2, 1940, Serial No. 322,042. In Germany June 25, 1938

7 Claims. (Cl. 260—461)

The present invention relates to a process of purifying phosphoric acid esters used for the dephenolization of waste aqueous liquors.

Phosphoric acid esters, as trialkyl- or triarylphosphates, for example tricresyl phosphate, are frequently employed for the extraction of phenols from waste aqueous liquors containing phenols. When so used they are contaminated by the absorption of non-volatile or difficultly volatile substances contained in the liquors in addition to phenols. When removing the phenols from the esters by distillation the impurities are retained in the esters, these becoming thereby considerably enriched within a relatively short time if the esters are used repeatedly for phenol extraction after distilling the phenols.

Esters containing from about 10 to 15 per cent of contaminations non-removable by distillation are hardly capable of absorbing phenols any longer and require thorough purification.

By conventional methods the contaminations were precipitated by treating the esters with concentrated sulphuric acid and then removed mechanically, for example by filtration. This method of working has the drawback that sulphonic acids are formed in considerable proportions which provoke a marked solubility of the esters in water with a consequent high loss of esters. Besides, the precipitation of asphaltic substances is incomplete in many instances, as shown by the dark coloration of the esters after their treatment with sulphuric acid. The filtration of the substances precipitated gives no satisfactory results either, because the filter residue retains substantial proportions of ester.

We have now found that the said drawbacks can be avoided by mixing the esters to be purified with substances having a large inner surface, for example kieselguhr, bleaching earth or active charcoal and dissolving the esters out therefrom by means of a solvent which advantageously has no or but little dissolving power towards asphalts, preferably with aliphatic hydrocarbons, for example light naphtha, or liquefied gases, for example propane or butane. The ester obtained after removal of the solvent is hardly inferior in its principal properties, as solubility in water and capacity of absorbing phenols, to the technically pure ester.

As a specially suitable substance from among those possessing a large inner surface we may mention lignite coke, especially when in an etched state.

The following example will further illustrate the nature of this invention but the invention is not restricted thereto.

Example 1000 lbs. of tricresylphosphate which has served for the dephenolization of waste aqueous liquors from coal or oil hydrogenation plants and thus absorbed 15 per cent of contaminations which cannot be removed by distillation, is mixed, after removing of the phenols, with 500 lbs. of dried kieselguhr or 1000 lbs. of dry lignite coke. The crumby mass obtained is exhaustively extracted with liquid butane, liquid propane or gasoline and the solvent removed from the extract by distillation. 810 lbs. of purified tricresylphosphate are thus obtained, i. e. about 95 per cent of the pure ester initially used.

The following table will demonstrate the superior quality of a tricresylphosphate after purification according to the present invention, in comparison to the commercially pure ester initially used, to an ester used and afterwards freed of phenols only and to an ester purified by a treatment with sulfuric acid.

|  | Ester purified according to the present invention | Pure ester | Used and dephenolized ester | Ester purified with $H_2SO_4$ |
|---|---|---|---|---|
| $d\ 15$ | 1.175 | 1.180 | 1.215 | 1.197. |
| Percentage of contamination. | 0 | 0 | 15 | 3.5. |
| Solubility in water | 21 milligrams per one liter of $H_2O$. | 17 milligrams per one liter of $H_2O$. | 86 milligrams per one liter of $H_2O$. | 2075 milligrams per one liter of $H_2O$. |

What we claim is:

1. A process for purifying phosphoric acid esters used for the dephenolization of waste aqueous liquors and freed from phenols, which comprises mixing the esters with an adsorbent selected from the group consisting of lignite coke and active charcoal in an amount sufficient to adsorb the esters and the impurities contained therein and extracting from the mixture thus obtained the esters by means of a solvent for the esters which has a low solvent power toward asphalts.

2. The process set forth in claim 1 in which the adsorbent is lignite coke in an etched state.

3. The process set forth in claim 1 in which the solvent is a low-boiling aliphatic hydrocarbon solvent.

4. A process for purifying trialkyl and triaryl phosphates containing aspi.ltic impurities, which comprises mixing the phosphates with an adsorbent selected from the group consisting of lignite coke and active charcoal in an amount sufficient to adsorb the phosphates and the impurities contained therein and extracting from the mixture thus obtained the phosphates by means of a solvent for the phosphates which has a low solvent power toward asphalts.

5. The process set forth in claim 4 in which the phosphate is tricresyl phosphate.

6. The process set forth in claim 4 in which the adsorbent is lignite coke in an etched state.

7. The process set forth in claim 4 in which the solvent is a low-boiling hydrocarbon solvent.

HERMANN BEEG.
RUDOLF SCHMIDT.